United States Patent

Husted et al.

Patent Number: 5,768,632
Date of Patent: Jun. 16, 1998

[54] METHOD FOR OPERATING INDUCTRIAL CONTROL WITH CONTROL PROGRAM AND I/O MAP BY TRANSMITTING FUNCTION KEY TO PARTICULAR MODULE FOR COMPARISON WITH FUNCTION CODE BEFORE OPERATING

[75] Inventors: Raymond R. Husted, Mentor; Donald A. Westman, Mentor-On-The-Lake; Michael D. Yoke, Mentor; Michael S. Pelley, Mayfield Heights, all of Ohio

[73] Assignee: Allen-Bradley Company, Inc., Milwaukee, Wis.

[21] Appl. No.: 620,963

[22] Filed: Mar. 22, 1996

[51] Int. Cl.$^6$ .......................................... G06F 9/00
[52] U.S. Cl. .................. 395/892; 364/151; 364/138
[58] Field of Search ........................ 364/200, 900, 364/138, 550, 151; 384/4; 395/275, 500, 892

[56] References Cited

U.S. PATENT DOCUMENTS

| | | | |
|---|---|---|---|
| 4,901,232 | 2/1990 | Harrington et al. | 364/200 |
| 4,937,777 | 6/1990 | Flood et al. | 364/900 |
| 4,949,299 | 8/1990 | Pickett | 364/900 |
| 5,068,778 | 11/1991 | Kosem et al. | 364/138 |
| 5,257,353 | 10/1993 | Blank et al. | 395/275 |
| 5,260,999 | 11/1993 | Wyman | 384/4 |
| 5,444,642 | 8/1995 | Montgomery et al. | 364/550 |
| 5,450,570 | 9/1995 | Richek et al. | 395/500 |

*Primary Examiner*—Thomas C. Lee
*Assistant Examiner*—David Ton
*Attorney, Agent, or Firm*—Keith Baxter; John M. Miller; John J. Horn

[57] ABSTRACT

In an industrial controller associated with independent I/O modules for exchanging signals between a controlled machine and the controller, a control program executed by the controller is associated with an I/O map identifying functionality of the independent I/O modules. At initialization of the controller, function keys are transmitted to the I/O modules, the latter which confirm that they are capable of the functions expected by the control program. The I/O modules may change their function according to the function keys and may accept functions not identical to those performed by the I/O module if the I/O module performs at greater functionality.

7 Claims, 3 Drawing Sheets

FIG. 5

| MODULE EQUIVALENCE TABLE | |
|---|---|
| CODE | SETTING |
| 01 / 200 / 10 / 4.3 | 1 |
| 12 / 200 / 92 / 3.2 | 1 |
| 14 / 200 / 18 / 1.6 | 1 |
| 01 / 400 / 10 / 1.2 | 2 |
| 12 / 400 / 43 / 3.1 | 2 |

METHOD FOR OPERATING INDUCTRIAL CONTROL WITH CONTROL PROGRAM AND I/O MAP BY TRANSMITTING FUNCTION KEY TO PARTICULAR MODULE FOR COMPARISON WITH FUNCTION CODE BEFORE OPERATING

FIELD OF THE INVENTION

The present invention relates to industrial controllers for the real-time control of industrial processes, and in particular to an industrial controller where the function of its input/output modules is confirmed by the control software prior to execution of the control software.

BACKGROUND OF THE INVENTION

Industrial controllers are special purpose computers used for controlling industrial processes or manufacturing equipment. Under the direction of a stored control program, the industrial controller examines a series of inputs, reflecting the status of a controlled process or controlled equipment, and changes outputs effecting control of the process or equipment. In the simplest case, the inputs and outputs are binary, that is "ON" or "OFF"; however, analog inputs and outputs taking on a continuous range of values and multi-bit digital values are also used.

Industrial controllers are frequently organized with a central computer-like processor communicating with a number of separate I/O modules that may be spatially remote from the processor and connected to the processor by means of a communication network. The I/O modules serve generally as the interface between the processor and particular control points on the machine or process. By virtue of the communication network, the I/O modules may be located adjacent to their control points on the machine or process.

The I/O modules typically include one or more microprocessors executing "firmware" programs stored in non-volatile memory on the I/O modules and controlling their operation. The proper performance of the control program is dependent on both the hardware of the central processor and the hardware and firmware of the I/O modules. Minor changes in the design or the programming of the I/O modules may adversely affect the operation of the control program.

The hardware and firmware of the I/O modules for a given vendor changes over time as the product is improved. Changes in the firmware of the I/O modules are normally expressed in terms of a revision number having a integer and decimal part. Major revisions, indicated by the integer part of the revision number, normally relate to changes in fundamental functions of the I/O modules. Minor revisions, indicated by the decimal part of the revision number, are normally limited to corrections of error and improvements of existing functions.

Dividing the operation of the industrial controller among the central processor and a number of separate I/O modules, permits the industrial controller to be flexibly configured to meet a given control task without the need to purchase and configure unnecessary I/O modules. If additional control points are needed, additional I/O modules may be connected to the communications network. The modularity of the industrial controller also improves it's serviceability. A failure of a single I/O module requires replacement only of that module.

The control program executed by the central processor may be extremely complex and involve years of programming time to write and perfect. Modifications of the control program are expensive. For this reason, when an I/O module fails, if possible it is replaced with an identical I/O module preferably having the same revision number, eliminating any need to revise the control program and any possible incompatibility with the existing control program.

For practical reasons, it is not always possible to find the identical I/O module. Normal product development will result in current products having later revision numbers. The exact differences between I/O modules with different revision numbers will normally not be known by the user the ability to substitute one I/O module for another can be hard to assess.

The desire to continue to use older versions of I/O presents the manufacturer with the burden of stocking multiple versions of particular I/O modules and reduces the demand for new products that would be desirable to many users, but that risks problems of incompatibility for existing users.

Use of an incompatible I/O module can create errors in the operation of the control program that are difficult to diagnose. This problem can occur when a control program or portions of a control program known to be working at one site are transported to use elsewhere with different hardware. Detecting and correcting the errors of this kind requires an intimate understanding of the control program and can be extremely time consuming and expensive.

SUMMARY OF THE INVENTION

The present invention attaches information about the functionality of the I/O module to particular control software and to the I/O modules themselves. In this way, the industrial controller can identify any incompatibilities in the I/O modules prior to operation of the program.

Each I/O module stores a function code indicating its functional capability as reflected in a revision number and general product description. A function key associated with the control program is transmitted to the I/O module and compared in the I/O module to the I/O module's function code. The module determines whether there is compatibility between the control program and itself. If there is no compatibility, a fault signal is returned to the controller holding the control software.

Specifically, the method provides for an entering of a control program into the memory of a central processor where the control program designates an exchange of data with at least one input/output module during at least one program step of that control program. A network database is also entered into the memory of the central processor which provides a function key for the input/output module. The function key indicating a desired function to be performed by the input/output module in order that the control program be properly executed. The function key is transmitted from the central processor to the input/output module for comparison of the function code to the transmitted function key. The input/output module transmits in turn to the central processor a message indicating whether the desired function can be performed by the input/output module. If the desired function can be performed by the input/output module, it is operated to perform that desired function.

Thus, it is one object of the invention to make the hardware assumptions implicit in a particular control program explicit so that the necessary input/output modules needed for particular control operation are confirmed automatically prior to execution of the control program. The use of function keys associated with the program assists in

3 moving the program to other equipment and sites, which may have different network configurations, and in replacing input/output modules when input/output modules fail.

It is another object of the invention to permit the manufacturer of I/O modules to upgrade the functionality of the I/O modules without making installed control systems obsolete or requiring current users to rewrite of pre-existing control software.

Because the module is the final arbiter of compatibility, later releases of I/O module software and hardware can be programmed to accept function keys indicating lesser functionality and to operate in accordance with that function key. The need to stock multiple versions of the I/O modules is reduced and the user is freed from compatibility concerns best left to the manufacturer.

It is another object of the invention to provide for a module keying that does not require extensive evaluation of module functions. The module key may be simply a product identifier and revision number which may be compared directly without the need for an independent determination of functionality. Exact compatibility can be insisted on in critical applications by a perfect matching of function key and code. The revision number which is simply a tallying of how many times the module has been revised, thus serves as a simple proxy for functional compatibility.

It is yet another object of the invention to further reduce stocking costs by constructing I/O modules with multiple "personalities" providing more than one mutually exclusive function, the function performed being based on the received function key. By resolving the compatibility question at the I/O module, a single multipurpose module can automatically reconfigure to match the requirements of the control program in a manner invisible to the control program.

The foregoing and other objects and advantages of the invention will appear from the following description. In this description, references are made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 5 is a figure similar to that of FIG. 3 showing a Module Equivalence Table stored in the memory of the I/O module.

4

DETAILED DESCRIPTION OF THE PREFERRED EMBODIMENT

CONTROLLER HARDWARE

Figure 1:
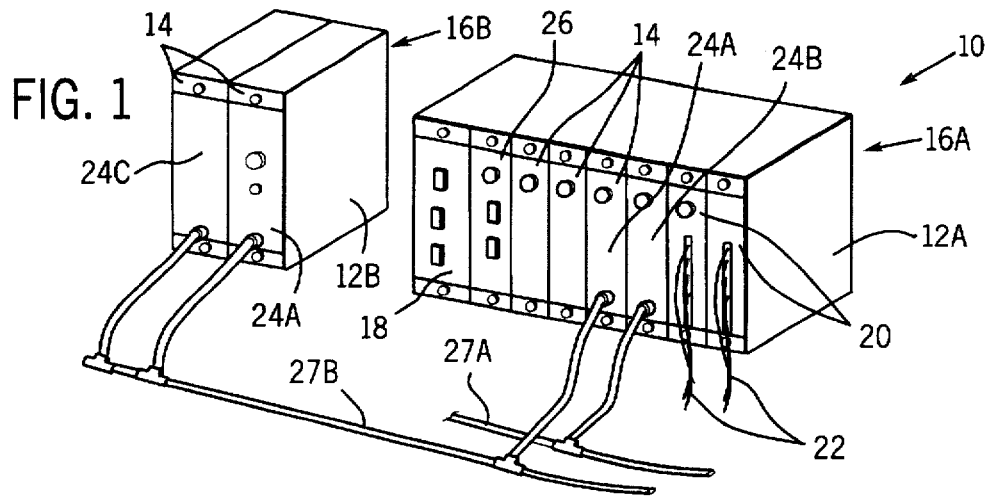
FIG. 1 is a perspective view of an industrial controller having a central processor and having input/output modules contained in the same housing as the central process and in remote housings connected by a communication link.

Referring to FIG. 1, an industrial controller 10 suitable for use with the present invention provides a first and second rack 1 2A and 1 2B for holding a number of functional modules 14 (including I/O modules 20) electrically interconnected by back planes 16A and 16B running along the rear of the racks 12A and 12B, respectively. Each module 14 may be individually removed from the rack 12A and 12B thereby disconnecting it from its respective back plane 16 for replacement or repair and to allow custom configuration of the industrial controller 10.

The modules 14 within the rack 12A may include, for example, a power supply module 18, a central processor (henceforth designated automation controller 26), communication bridges 24A and 24B and two I/O modules 20.

Power supply module 18 receives an external source of power (not shown) and provides regulated voltages to the other modules 14 by means of conductors on the back plane 16A.

Automation controller 26 processes information provided by the I/O modules 20 (via the bridges 24 for some I/O modules 20) according to a stored control program and provides output information to the I/O modules 20 in response to that stored control program.

The bridges 24A and 24B provide an interface between the back plane 16 and one of the two external high speed communication links 27A and 27B to remote I/O modules 20 in remote racks 12 as will be described.

As described above, I/O modules 20 provide an interface between inputs from and outputs to control points 23 on external equipment (shown in FIG. 2) via cabling 22 attached to the I/O modules 20 at terminals on their front panels. As is understood in the art, the I/O modules 20 convert input signals on the cables 22 to digital words for transmission on the back plane 16A or the communication links 27. The I/O modules 20 also convert other digital words from the back plane 16A to the necessary signal levels for control of equipment.

Figure 2:
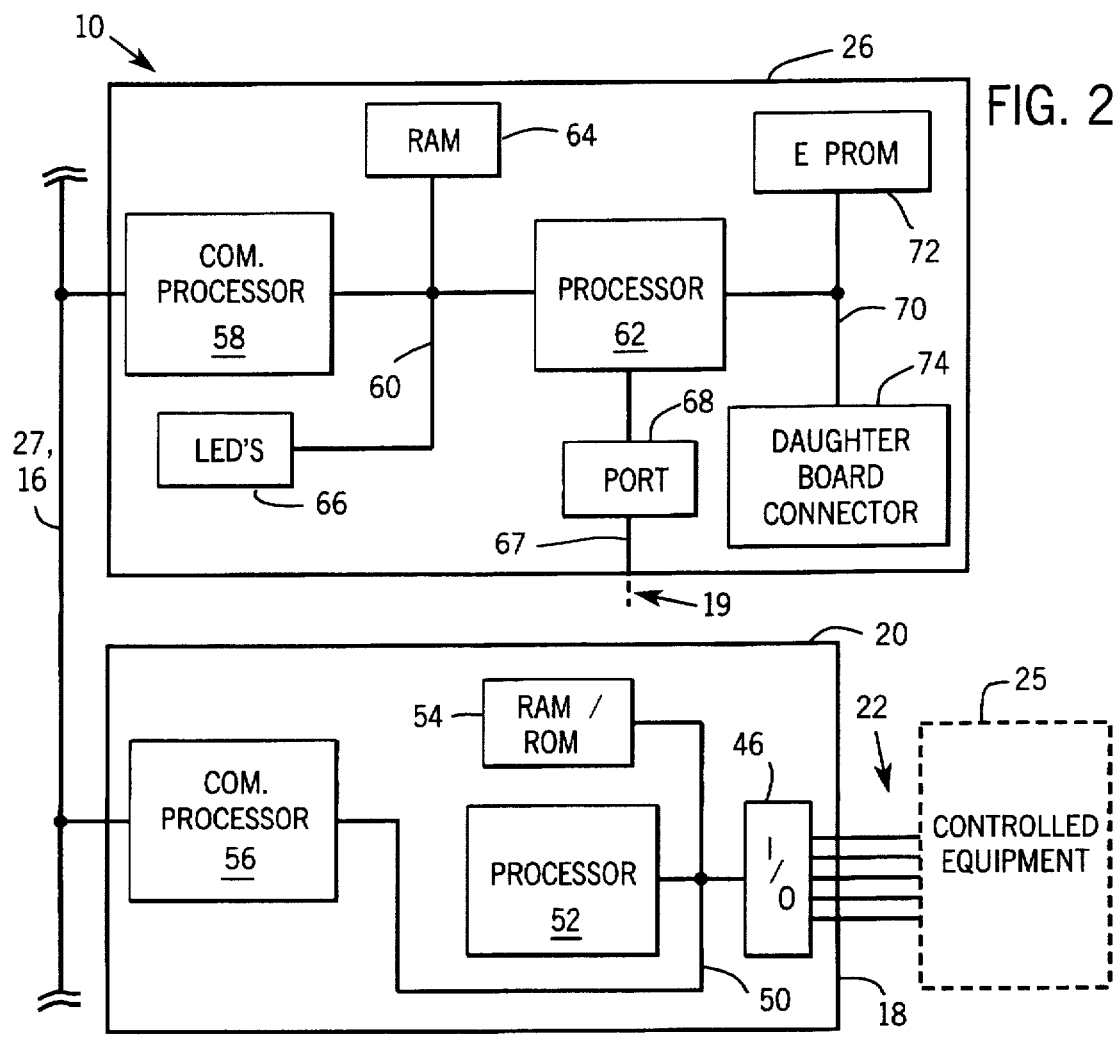
FIG. 2 is a schematic block diagram of the industrial controller and one I/O module of FIG. 1 showing the memory of the central processor holding a control program and a function key in a network database, and showing memory in the I/O module holding a corresponding function code.

Referring now to FIGS. 1 and 2, the signals from the control points 23 of the controlled equipment 25 are received by the I/O modules 20 at interface circuitry 46. The interface circuitry 46 contains protection devices, such as optical isolators and conversion circuitry, and analog to digital or digital to analog circuitry, for converting the I/O signals from control points 23 to digital representations that may be transmitted on an internal bus 50 of the I/O modules 20.

The internal bus 50 communicates with an I/O module processor 52, a memory unit 54 composed generally of a combination of random access and read-only memory (RAM/ROM) and a communication processor 56 connecting the I/O module 20 to a high speed back plane 16 or communication link 27 for communication with the other modules 14 and in particular, the automation controller 26. The processor 52 thus may receive instructions, programming, and in particular a function key, from automation controller 26 as will be described below.

A communication processor 58 is also contained in the automation controller 26 to handle the communication protocols of the high speed back plane 16 or the links 27. The communication processor 58 relays information between other modules 14 and at an internal bus 60 of the automation controller 26. The internal bus 60 is also connected to the processor 62 of the automation controller 26 as well as random access memory (RAM) 64 and a front panel LED display 66. The processor 62 provides a separate serial port 68 used for diagnostics and programming and another internal bus 70 communicating with read-only memory (ROM) 72 and a daughter board connector 74 which may be used for memory expansion on a separate card.

Generally, during operation, the processor 62 reads program instructions from the ROM 72 and transfers data to and from RAM 64, that data representing desired inputs and outputs, the data then interchanged by the communication processor 58 with the I/O modules 20 and thus with the controlled equipment 25. The general architecture and operation of the industrial controller 10 and the I/O module 20 thus far described will be familiar to those of ordinary skill in the art.

CONTROL PROGRAM

Figure 3:
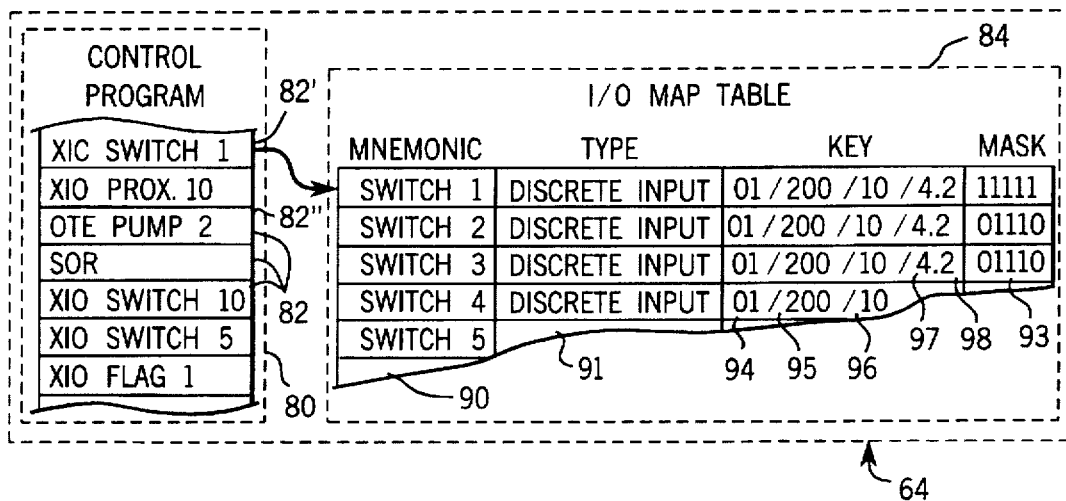
FIG. 3 is a schematic representation of the memory of the central processor of FIG. 2 showing the control program referencing the network data base (I/O Map Table) holding keys for different I/O modules used in the control program.

Referring now to FIGS. 2 and 3, prior to operation of the industrial controller 10, the RAM 64 of the automation controller 26 is loaded with a control program 80 defining the logic of the control of the industrial process 25. The control program 80 is composed of a series of computer instructions 82 which together instruct the automation controller 26 to provide the necessary control signals to the process 25.

In the embodiment shown, the instructions 82 are examples of relay ladder language instructions well known in the art and summarized below in Table I.

TABLE I

| Instruction Mnemonic | Meaning |
| --- | --- |
| SOR | Start of Rung |
| BST | Branch Start |
| XIO | Normally Closed Contact (examine if open) |
| XIC | Normally Open Contact (examine if closed) |
| NXB | Next Branch |
| BND | Branch End |
| OTE | Output Coil (Output Enable) |
| EOR | End of Rung |

Relay ladder language instructions describe interconnections of virtual relay contacts and coils that would receive and produce the necessary control signals to control the process 25. Input signals are received by the control program 80 by the execution of input instructions which have as an operand a control point 23 on an I/O module 20. Input instructions include, for example, XIC (examine if closed) or XIO (examine if open) instructions well known in the art of industrial control. Each of these instructions XIC and XIO tests the value of the input signal from a control point 23 designated by its operand. For example, instruction 82' which reads"XIC switch 1" examines for closure a switch 1 which may be a switch within the controlled equipment 25 attached to a particular terminal on an I/O module 20.

Conversely, output signals are output by the control program 80 by the execution of out instructions which have as an operand an output at a control point 23 at an I/O module 20 and include, for example, the OTE (output enable) instruction also well known in the art of industrial control. For example, instruction 82" which reads "OTE pump 1" outputs a signal to the controlled equipment 25 attached to a particular terminal on an I/O module 20.

Other input and output instructions and additional logical instructions are well known in the art and found in modern commercial industrial controllers.

I/O MAP TABLE

Memory 64 also includes an I/O map table 84 shown in FIG. 3 as a four column multi-row table where elements in each row are related. The I/O map table is linked to the control program 80 and copied with the control program 80 when the control program 80 is, for example, transported to a new industrial controller. The data in the I/O map table may be entered by the programmer of the industrial controller 10 according to method well known in the art and according to the requirements described below. As will be described in detail below, the I/O Map Table 84 is used to ensure compatibility between the control program 80 and the I/O modules 20 used with the industrial controller 10.

Each different operand for an input or output instruction (e.g.,"switch 1" or "pump 1") in the control program 80 maps to a row in the I/O map table 84. In the present embodiment, the operand includes a field (not shown) indicating the I/O module 20 responsible for the data of that operand. The I/O map table 84 thus has one row for each I/O modules 20 and thereby serves to link operands identifying a particular control point 23 in the controlled equipment 25 to other information, in this case, information about the I/O module 20 through which the control point 23 is connected. Accordingly, the first column of the I/O map table 84 is the mnemonic 90 for the I/O module 20 holding the control point 23. For clarity, however, the mnemonic 90 shown in that of the operand itself rather than of its associated I/O module 20 as would be the case in practice.

After this mnemonic 90 comes a functional type 91 which describes a general functional classification of the I/O module 20 providing the interface to the particular control point 23 in the controlled equipment 25. Each functional type 91 is indicated by a previously designated number represented here as a text string. The most common functional types 91 are discrete input or discrete output I/O modules 20 which each receive or transmit one or more binary values from or to a control point 23. Other functional types 91 include I/O modules that provide for block transfers of multiple bits of data, for example, as is necessary if the signal at the control point 23 is analog. More complex I/O modules 20 such as motor controllers and the like have different functional types 91. A functional type 91 is also provided for bridge modules 24 which serve to interconnect different communication links 27 and for the industrial controller 10 itself.

The classifications of the functional types 91 are intended to be broad and to group within a single functional type 91 a number of I/O modules with similar functions and similar data communications requirements from different manufacturers. The functional type entry 91 of the I/O map table 84 may be used to select software for communicating with the module, a so-called driver, based on the data communication requirements.

The next information in each row of the I/O map table is a function key 92 which contains further information about the functional capabilities of the I/O module 20 as reflected in the manufacturer's part designations and revision numbers. The function key 92 is divided into a number of fields 94 through 98 which will now be described.

The first two bytes (8 bits) of the function key 92 is a unique vendor identification number 94 ("Vendor ID") being an arbitrary number selected and assigned to a particular vendor to identify that vendor. This is followed by a two byte product code 95 which may be assigned by the vendor and is also an arbitrary sixteen bit number. Together with the vendor ID 94, the product code 95 normally uniquely identifies the product hardware.

The next two bytes of the function key 92 are a catalog number 96 also assigned to the I/O module 20 by the vendor and generally conforming to the vendor's cataloging of products.

The last two bytes of the function key 92 (represented as a decimal fraction) are a major 97 and minor revision number 98 (the minor revision number being the decimal part of the revision number). Such revision numbers are normally used to track firmware changes in a product, that is changes in the programming software of the I/O module stored in non-volatile memory. Typically minor revisions are those which change the firmware to correct for errors, but which do not significantly affect the intended function of the module. Major revisions are larger in scope and may delete or add functions to the I/O module 20. While the distinction between major and minor revision is followed only generally, together the major 97 and minor revision numbers 98 provide a very sensitive indication of the function of the I/O module 20: identical revision numbers 98 in two I/O modules 20 are strong evidence of compatibility.

The revision numbers 97 and 98 as such also establish a degree of crosscompatibility between I/O modules 20 of different revision numbers. Normally, I/O modules with greater major revision numbers 97 can replace I/O modules 20 having smaller major revision numbers 97, but not vice-versa. With respect to minor revision numbers 98, often there will be both upward and downward compatibility, however, greater minor revision numbers 98 are normally more likely to be downward compatible.

In the present embodiment, a major revision number of 128 or higher (most significant bit set) is assumed to be that revision number minus 128, and this indicates that the minor revision number should exactly match that of the minor revision of the I/O module 20 to be used with the control program 80, as will be described below.

The next column of the I/O map table 84 provides a mask 93 which is five binary digits each of which may be set (to one) or reset (to zero) and which in the setting and resetting indicate which of the previous fields 94-98 should be used in a matching to be described below (the last two bits of the mask 93 are for major and minor revision respectively). Thus, for a mask value 11111 each of these fields should be evaluated to determine if the I/O module is appropriate for the control program 80. A mask value of 01110 might be used if it were desired that the I/O module 20 be functionally constrained to a particular category, but if it was acceptable that it be purchased from any vendor and have any minor revision number. The zero values in this example correspond to the vendor ID field 94 and the minor revision number 98.

MODULE EQUIVALENCE TABLE

Figure 5:
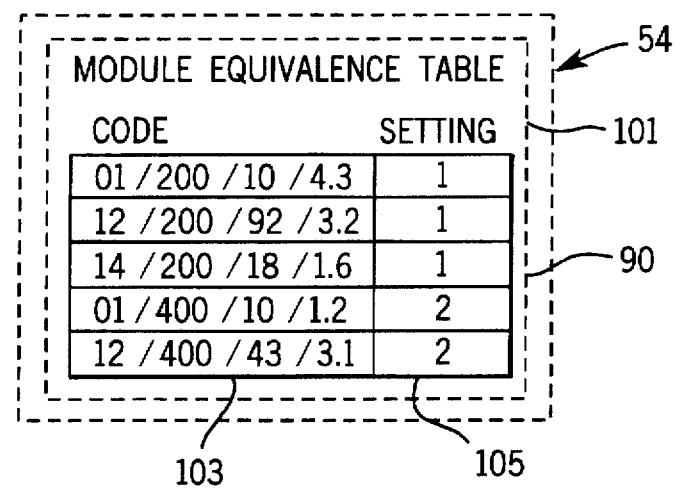

Referring now to FIGS. 2 and 5, the read-only memory 54 of the I/O module 20 includes a module equivalence table 101 depicted as a table having two columns related along one or more rows. The first column provides a function code 103 similar to the function key 92 of the I/O map table 84. The function code 103 thus has the same fields of vendor ID 94, product code 95, catalog number 96, and major and minor revision number 97 and 98.

The second column provides a software setting number 105 that provides information to the processor 52 of the I/O module 20 as to how it should function to emulate an I/O module 20 having the characteristics described by the function code 103. Depending on the match of an incoming function key 92 to a particular function code 103 in the module equivalence table 101, the setting number 105 will instruct the processor 52 to execute different programs within the RAM and ROM 54 to provide a different function commensurate with the function desired as indicated in the transmitted key.

As indicated, the module equivalence table 54 may have multiple rows with additional different function codes 103. These additional function codes 103 reflect the function codes of I/O modules equivalent to the particular I/O module 20—for example I/O modules that are identical except for being made by different vendors or having different catalog numbers. These additional rows may also include function codes 103 that differ only in revision number where the revision has been determined to not affect the operation of the I/O module or where the particular I/O module has a later revision number and is downwardly compatible with earlier revision numbers listed in the table. In these cases the setting number 105 will be the same and the I/O module will operate the same regardless of which of the function codes 103 matches with the function key 92 of the automation controller 26.

On the other hand, as indicated by the fourth and fifth rows in the module equivalence table 101, the I/O module 20 may have the capability of performing a different set of functions. For example, it may be practical to use essentially the identical hardware for a binary input and binary output module so as to reduce the need to stock and inventory separate parts. Thus, a single module 20 might have function codes 103 commensurate with different functions. In this case, the I/O module can perform functions in either product code 200 or 400 (discrete input or discrete output, respectively). Different setting numbers 105 are associated with these different functions

KEYING PROTOCOL

Figure 4:
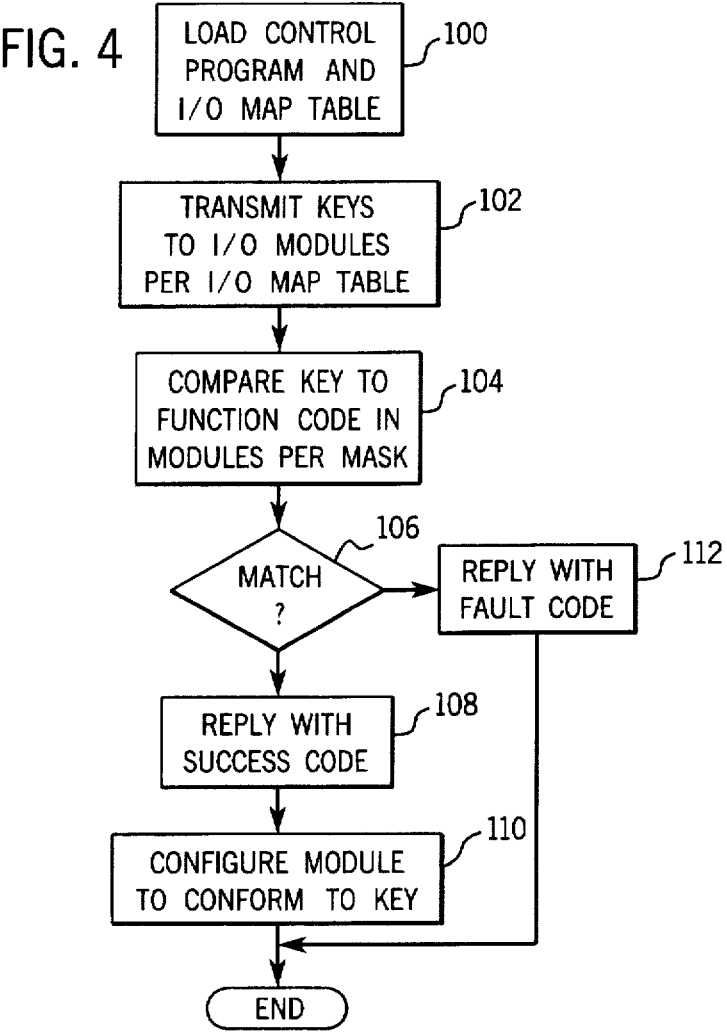
FIG. 4 is a flow chart showing the steps of the present invention in which the functions of the I/O modules are confirmed and the I/O modules are configured per the present invention.

Referring now to FIGS. 3, 4 and 5, at process block 100 in the present invention, the control program 80 and the I/O map table 84 are loaded into the memory 64 of the processor 62. The program 80 and the table 84 may be developed, for example, on an off-line editor according to techniques well known in the art.

At process block 102, the key 92 for each I/O module 20 having a control point 23 referenced in the control program 80 is transmitted over links 27 to the corresponding I/O module 20. For example, the I/O module 20 for the control point 23 designated "switch 1" in instruction 82" receives a key of 01/200/10/4.2 as indicated in the I/O Map Table of FIG. 3.

The mask 93 of the I/O map table 84 is not transmitted but used to replace particular fields 91-98 with a "wildcard" character (zero) indicating to the I/O module 20 that a match in these fields is not required.

At process block 104, the transmitted key 92 is compared by the I/O module 20 to the function codes 103 in the I/O module equivalent table 101 according to the set bits of the mask 93 as previously described. Thus, only the items in the function key 92 corresponding to set bits in the mask 93 are compared.

In this example of the I/O module for switch 1, the function key 92 will match with the function code 103 of the first row of the module equivalence table 101 except for the minor revision number which in the key is 4.2 and in the code is 4.3.

At decision block 106, whether a match has occurred is determined. In this case, because the most significant bit in the major revision number is not set (i.e., the major revision number is less than 128) the I/O module 20 is instructed that a perfect match in the minor revision field is not required and thus all minor revision values less than or equal to the minor revision field in the code will be accepted. For this reason a match between the key and the code is indicated.

Assuming there is a match, then at process block 108, the control module 20 returns a success code to the automation controller 26 allowing the control program 80 to be executed.

At process block 110 the setting number 105 is provided to the processor 52 to guide its future operation to conform with the functions indicated by the matching key and code. In the above example, a setting value of 1 is provided to the processor 52 to cause it to execute a program stored in the memory 54 to provide a discrete input.

If at the decision block 106, a match is not obtainable in any of the rows of the module equivalence table 54, then at process block 112 the I/O module 20 responds to the processor 52 with a fault code indicating a lack of function match between the control program 80 and the hardware of the I/O modules 20. This fault code indicates which of the fields 94-98 fail to match, e.g., vendor ID, product type, catalog number, major revision or minor revision.

As noted above, by pushing the decision making process for the matching to the I/O modules 20, newer I/O modules 20 can include in their module equivalence tables 101, entries for older modules 14 and older catalog numbers to ensure upward compatibility.

The above description has been that of a preferred embodiment of the present invention. It will occur to those that practice the art that many modifications may be made without department from the spirit and scope of the invention. In order to apprise the public of the various embodiments that may fall within the scope of the invention, the following claims are made.

We claim:

1. A method of operating an industrial controller, the controller executing a control program to exchange data with a plurality of input/output modules, each input/output module having at least one self-contained function indicated by a function code stored in the input/output module, the method comprising the steps of:

(a) entering the control program into memory of the industrial controller, the control program designating an exchange of data with a particular input/output module in at least one program step of the control program;

(b) entering an I/O map table into the memory of the industrial controller, the I/O map table providing a function key for the input/output module, the function key indicating a desired self-contained function to be performed by the input/output module in order that the control program be properly executed;

(c) transmitting the function key from the industrial controller to the particular input/output module for comparison of the function code to the transmitted function key;

(d) transmitting from the particular input/output module to the controller a message indicating whether the desired self-contained function can be performed by the particular input/output module; and (e) operating the particular input/output module to perform the desired self-contained function.

2. The method of claim 1 wherein the self-contained function key and function code include revision numbers indicating how many times the function of an input/output module has been revised by its manufacturer, and wherein the function key includes a match value indicating whether an exact match between the revision numbers of the function code function key is required, and wherein when the match value indicates that an exact match is not required then at step (d) the message transmitted from the particular input/output module to the controller indicates that the desired self-contained function can be performed if the revision number of the function key is less than or equal to the revision number of the function code.

3. The method of claim 1 wherein the function key and function code include information selected from the group consisting of:

a vendor identification number identifying the manufacturer of the particular input/output module;

a product type identification number indicating a general function of the particular input/output module;

a catalog number selected by the manufacturer for designating the particular input/output module for purchase; and a major and minor revision number together indicating how many times the self-contained function of an input/output module has been revised; and wherein step (c) compares the information selected from this group.

4. The method of claim 3 wherein the function key and function code include all of the vendor identification number, the product type identification number, the catalog number, and the major and minor revision number, and wherein the function key also includes a mask indicating which of these numbers are to be compared at step (c) and wherein step (c) compares only the numbers indicated by the mask.

5. The method of claim 1 wherein input/output modules provide first and second self-contained functions indicated by a first and second function code respectively, the first self-contained functions providing capabilities that are a subset of the capabilities of the second self-contained function, and wherein the particular input/output module provides the second self-contained function wherein at step (d) the particular input/output module transmits to the controller a message indicating that the desired self-contained function can be performed by the particular input/output module when the function key matches the first or second function code; and wherein at step (e) the particular input/output module operates to perform the second self-contained function.

6. The method of claim 1 wherein input/output modules provide first and second self-contained functions indicated by a first and second function code respectively, the first self-contained function providing capabilities that are mutually exclusive to the capabilities of the second self-contained function, and wherein the particular input/output module provides both of the first and second self-contained function wherein at step (d) the particular input/output module transmits to the controller a message indicating that the desired self-contained function can be performed by the particular input/output module when the function key matches the first or second function code; and wherein at step (e) the particular input/output module operates to perform the desired self-contained function indicated by the function key.

7. The method of claim 1 wherein the function key and function code include information selected from the group consisting of:

a vendor identification number identifying the manufacturer of the particular input/output module;

a product type identification number indicating a general function of the particular input/output module;

a catalog number selected by the manufacturer for designating the particular input/output module for purchase; and a major and minor revision number together indicating how many times the function of an input/output module has been revised; and wherein at step (d) when the desired function cannot be performed by the particular input/output module the message indicates a point of failure of matching selected from this group.

* * * * *